United States Patent
Savolainen et al.

(10) Patent No.: US 10,079,917 B2
(45) Date of Patent: Sep. 18, 2018

(54) METHOD AND APPARATUS FOR SYNTHESIZED ADDRESS DETECTION

(75) Inventors: Teemu Ilmari Savolainen, Nokia (FI); Jouni Korhonen, Riihimaki (FI)

(73) Assignee: Nokia Technologies Oy, Espoo (FI)

( * ) Notice: Subject to any disclaimer, the term of this patent is extended or adjusted under 35 U.S.C. 154(b) by 389 days.

(21) Appl. No.: 13/643,195

(22) PCT Filed: Apr. 26, 2010

(86) PCT No.: PCT/IB2010/051823
§ 371 (c)(1),
(2), (4) Date: Apr. 19, 2013

(87) PCT Pub. No.: WO2011/135405
PCT Pub. Date: Nov. 3, 2011

(65) Prior Publication Data
US 2013/0201999 A1    Aug. 8, 2013

(51) Int. Cl.
*H04J 3/16* (2006.01)
*H04L 29/06* (2006.01)
*H04L 29/12* (2006.01)

(52) U.S. Cl.
CPC .......... *H04L 69/08* (2013.01); *H04L 61/1511* (2013.01); *H04L 61/251* (2013.01); *H04L 61/6068* (2013.01); *H04L 61/6004* (2013.01); *H04L 61/6059* (2013.01)

(58) Field of Classification Search
CPC ...................................... H04L 12/66
See application file for complete search history.

(56) References Cited

U.S. PATENT DOCUMENTS

| | | | |
|---|---|---|---|
| 2004/0151202 A1* | 8/2004 | Mandavilli | H04L 45/02 370/463 |
| 2004/0179508 A1* | 9/2004 | Thubert | H04L 29/06 370/349 |
| 2005/0025157 A1* | 2/2005 | Pennec | H04L 12/4641 370/395.5 |
| 2005/0267978 A1* | 12/2005 | Satapati | 709/230 |

(Continued)

FOREIGN PATENT DOCUMENTS

| CN | 101043411 A | 9/2007 |
|---|---|---|
| CN | 101156147 A | 4/2008 |

OTHER PUBLICATIONS

Wing, "Learning the IPv6 Prefix of a Network's IPv6/IPv4 Translator", draft-wing-behave-learn-prefix-04, BEHAVE Working Group, Internet-Draft, Oct. 26, 2009, pp. 1-13.

(Continued)

*Primary Examiner* — Michael J Moore, Jr.
(74) *Attorney, Agent, or Firm* — Alston & Bird LLP

(57) ABSTRACT

A method and apparatus for synthesized address prefix detection is provided. One example method includes generating a request for a first protocol address record of a name that has been assigned an address in accordance with a second protocol, causing the request to be sent to a domain name system server, and analyzing a response to the request for the first protocol address record to determine whether the domain name system server generated a synthesized address for the name in accordance with the first protocol. Similar and related example methods and example apparatuses are also provided.

20 Claims, 7 Drawing Sheets

(56) References Cited

U.S. PATENT DOCUMENTS

| | | | | |
|---|---|---|---|---|
| 2008/0069137 | A1* | 3/2008 | Jimmei | H04L 12/66 370/466 |
| 2010/0260203 | A1* | 10/2010 | Moon | H04W 80/045 370/467 |
| 2011/0019677 | A1* | 1/2011 | Townsley | H04L 29/12358 370/401 |
| 2011/0110375 | A1* | 5/2011 | Boucadair | H04L 29/12358 370/393 |
| 2012/0005299 | A1* | 1/2012 | Xu | H04L 29/12358 709/208 |

OTHER PUBLICATIONS

Daigle, "Domain-Based Application Service Location Using URLs and the Dynamic Delegation Discovery Service (DDDS)", RFC4848, Network Working Group, Apr. 2007, pp. 1-10.

Huitema et al., "IPv6 Addressing of IPv4/IPv6 Translators", draft-ietf-behave-address-format-04.txt, Network Working Group, Internet-Draft, Jan. 15, 2010, pp. 1-18.

Bagnulo et al., "DNS64: DNS Extensions for Network Address Translation from IPv6 Clients to IPv4 Servers", draft-ietf-behave-dns64-07, BEHAVE WG, Internet-Draft, Mar. 5, 2010, 64 pages.

Bagnulo et al., "Stateful NAT64: Network Address and Protocol Translation from IPv6 Clients to IPv4 Servers", draft-ietf-behave-v6v4-xlate-stateful-09, BEHAVE WG, Internet-Draft, Mar. 6, 2010, pp. 1-44.

Wing, "DNS64 Resolvers and Dual-Stack Hosts", draft-wing-behave-dns64-config-02, BEHAVE Working Group, Internet-Draft, Feb. 12, 2010, pp. 1-15.

Boucadair, "DNS64 Service Location and Discovery", draft-boucadair-behave-dns64-discovery-00, Network Working Group, Internet-Draft, Oct. 19, 2009, pp. 1-12.

Boucadair, "A64: DNS Resource Record for IPv4-Mapped IPv6 Address", draft-boucadair-behave-dns-a64-01, Network Working Group, Internet-Draft, Oct. 23, 2009, pp. 1-15.

"[BEHAVE] Two Ideas", ieft.org, Retrieved on Apr. 29, 2014, Webpage available at : http://www.ietf.org/mail-archive/web/behave/current/msg08242.html.

"[BEHAVE] Review of draft-boucadair-behave-dns-a64-01", ieft.org, Retrieved on Apr. 29, 2014, Webpage available at : http://www.ietf.org/mail-archive/web/behave/current/msg07324.html.

Bao et al., "IPv6 Addressing of IPv4/IPv6 Translators", draft-ietf-behave-address-format-05.txt, Network Working Group, Internet-Draft, Mar. 14, 2010, pp. 1-18.

Lee et al., "Dual Stack Hosts Using "Bump-in-the-API" (BIA)", RFC3338, Network Working Group, Oct. 2002, pp. 1-17.

Tsuchiya et al., "Dual Stack Hosts Using the "Bump-In-the-Stack" Technique (BIS)", RFC2767, Network Working Group, Feb. 2000, pp. 1-13.

Vixie, "Extension Mechanisms for DNS (EDNS0)", RFC2671, Network Working Group, Aug. 1999, pp. 1-7.

Bagnulo et al., "DNS64: DNS Extensions for Network Address Translation from IPv6 Clients to IPv4 Servers", draft-ietf-behave-dns64-09, BEHAVE WG, Internet-Draft, Mar. 30, 2010, pp. 1-32.

Bagnulo et al., "NAT64: Network Address and Protocol Translation from IPv6 Clients to IPv4 Servers", draft-bagnulo-behave-nat64-03, BEHAVE WG, Internet-Draft, Mar. 7, 2009, pp. 1-26.

Baker et al., "Framework for IPv4/IPv6 Translation", draft-ietf-behave-v6v4-framework-08, Behave, Internet-Draft, Mar. 22, 2010, pp. 1-30.

Miyata et al., "PREFIX64 Comparison", draft-miyata-behave-prefix64-02.txt, Network Working Group, Internet-Draft, Mar. 9, 2009, pp. 1-24.

Xu et al., "Hybrid Type Prefix for IPv4-Embedded IPv6 Addresses", draft-xu-behave-hybrid-type-prefix-00, Network working group, Internet Draft, Jan. 15, 2010, pp. 1-9.

International Search Report and Written Opinion received for corresponding Patent Cooperation Treaty Application No. PCT/IB2010/051823, dated Dec. 9, 2010, 14 pages.

Office action received for corresponding Indonesian Patent Application No. W00201204144, dated Oct. 15, 2014, 1 pages of office action and 1 pages of office action translation available.

Office action received for corresponding Chinese Patent Application No. 201080066457.2, dated Mar. 19, 2015, 6 pages of office action and No English Language Translation available.

Tsirtsis, G. et al., *Network Address Translation—Protocol Translation (NAT-PT)*, Network Working Group,RFC 2766 (Feb. 2000) 22 pages.

Office Action from corresponding Chinese Patent Application No. 201080066457.2, dated Mar. 17, 2016.

Supplementary European Search Report for Application No. EP 10 85 0624 dated Sep. 14, 2016.

Braun, M. B., [*Int-area*] *Practical Issues With Using v-4-Mapped Addresses for nat64*, [online][retrieved Sep. 7, 2016]. Retrieved from the Internet: http://www.ietf.org/mail-archive/web/int-area/current/msg01476.html>. (dated Aug. 21, 2008) 3 pages.

Cao, Z. et al., *Dual Stack Hosts With DNS64*; draft-cao-behave-dsdns64-00; Internet Engineering Task Force, IETF (dated Feb. 12, 2010), 8 pages.

Office Action from corresponding Chinese Patent Application No. 201080066457.2, dated Oct. 18, 2016.

Office Action for European Application No. 10 850 624.7 dated Jun. 12, 2017.

NOIP's notification for corresponding Vietnamese Application No. 1-2012-03003, dated Jul. 27, 2017, 2 pages.

Office Action for corresponding Chinese Application No. 201080066457.2 dated Oct. 9, 2015.

Office action received for corresponding Chinese Patent Application No. 201080066457.2, dated Jul. 3, 2014, 6 pages of Office Action, 5 pages of English Translation.

Summons to Attend Oral Proceedings for European Application No. 10850624.7 dated May 16, 2018, 8 pages.

Office Action for Indonesia Application No. W00201204144 dated Jul. 4, 2018, 2 pages.

* cited by examiner

METHOD AND APPARATUS FOR SYNTHESIZED ADDRESS DETECTION

RELATED APPLICATION

This application was originally filed as PCT Application No. PCT/IB2010/051823 filed Apr. 26, 2010.

TECHNICAL FIELD

Embodiments of the present invention relate generally to communications, and, more particularly, relate to a method and apparatus for detecting and managing synthesized addresses.

BACKGROUND

The modern communications era has brought about a tremendous expansion of wireless networks. Various types of networking technologies have been developed resulting in unprecedented expansion of computer networks, television networks, telephony networks, and the like, fueled by consumer demand within a wireless communications environment. Wireless and mobile networking technologies have addressed related consumer demands, while providing more flexibility and immediacy of information transfer.

With the continued evolution of communications technology, new protocols have been developed and are being implemented. In some instances, networks undergo a transition period where an older protocol (for example, Internet Protocol version 4) and a newer protocol (for example, Internet Protocol version 6) are both being implemented. During this transition phase, inefficiencies in system operation can result from a number of network entities performing separate functionality to support the transition.

BRIEF SUMMARY

Example methods and example apparatuses are described herein that provide for synthesized address detection and management. One example method includes generating a request for a first protocol address record of a name that has been assigned an address in accordance with a second protocol, causing the request to be sent to a domain name system server, and analyzing a response to the request for the first protocol address record to determine whether the domain name system server generated a synthesized address for the name in accordance with the first protocol.

Additional example embodiments include an apparatus configured for synthesized address detection and management. One example apparatus comprises at least one processor and at least one memory including computer program code, the at least one memory and the computer program code configured to, with the at least one processor, cause the apparatus to perform various functionality. The example apparatus may be caused to perform generating a request for a first protocol address record of a name that has been assigned an address in accordance with a second protocol, causing the request to be sent to a domain name system server, and analyzing a response to the request for the first protocol address record to determine whether the domain name system server generated a synthesized address for the name in accordance with the first protocol.

Other example embodiments include a computer program product comprising a tangible computer readable storage medium having computer code stored thereon, wherein execution of the computer code causes an apparatus to perform various functionalities. Execution of the computer program code may cause an apparatus to perform generating a request for a first protocol address record of a name that has been assigned an address in accordance with a second protocol, causing the request to be sent to a domain name system server, and analyzing a response to the request for the first protocol address record to determine whether the domain name system server generated a synthesized address for the name in accordance with the first protocol.

Another example apparatus includes means for generating a request for a first protocol address record of a name that has been assigned an address in accordance with a second protocol, means for causing the request to be sent to a domain name system server, and means for analyzing a response to the request for the first protocol address record to determine whether the domain name system server generated a synthesized address for the name in accordance with the first protocol.

Another example method may include receiving a request from a host for a first protocol address record of a name that has been assigned an address in accordance with a second protocol and formulating a response to the request that includes an address of the name in accordance with the first protocol and a synthesis flag indicator. The synthesis flag indicator may be an indication of a length of a first protocol network indicator portion of the address of the name in accordance with the first protocol. Further, the example method may include causing the response to be sent to the host.

Another example apparatus comprises at least one processor and at least one memory including computer program code, the at least one memory and the computer program code configured to, with the at least one processor, cause the apparatus to perform various functionality. The example apparatus may be caused to perform receiving a request from a host for a first protocol address record of a name that has been assigned an address in accordance with a second protocol and formulating a response to the request that includes an address of the name in accordance with the first protocol and a synthesis flag indicator. The synthesis flag indicator may be an indication of a length of a first protocol network indicator portion of the address of the name in accordance with the first protocol. Further, the example apparatus may be further caused to perform causing the response to be sent to the host.

Other example embodiments include a computer program product comprising a tangible computer readable storage medium having computer code stored thereon, wherein execution of the computer code causes an apparatus to perform various functionalities. Execution of the computer code may cause an apparatus to perform receiving a request from a host for a first protocol address record of a name that has been assigned an address in accordance with a second protocol and formulating a response to the request that includes an address of the name in accordance with the first protocol and a synthesis flag indicator. The synthesis flag indicator may be an indication of a length of a first protocol network indicator portion of the address of the name in accordance with the first protocol. Further, execution of the computer code may cause the apparatus to perform causing the response to be sent to the host.

Another example apparatus includes means for receiving a request from a host for a first protocol address record of a name that has been assigned an address in accordance with a second protocol and means for formulating a response to the request that includes an address of the name in accordance with the first protocol and a synthesis flag indicator.

The synthesis flag indicator may be an indication of a length of a first protocol network indicator portion of the address of the name in accordance with the first protocol. Further, the example apparatus may include means for causing the response to be sent to the host.

BRIEF DESCRIPTION OF THE DRAWING(S)

Having thus described example embodiments of the invention in general terms, reference will now be made to the accompanying drawings, which are not necessarily drawn to scale, and wherein:

DETAILED DESCRIPTION

Figure 1A:
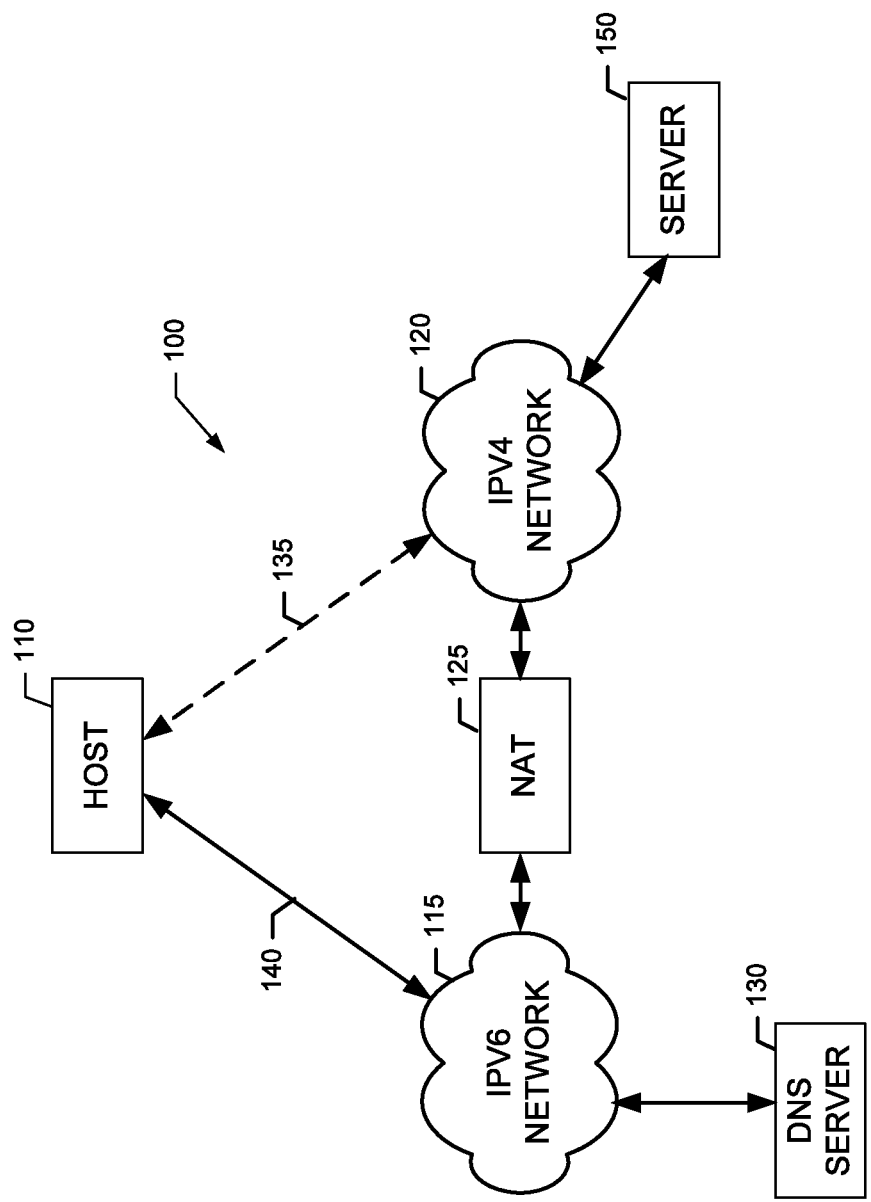
FIG. 1a illustrates a communications system according to some example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Various example embodiments of the present invention are described herein that operate or are configured to operate to facilitate determining a portion of an address that is indicative of a subnet or network. In some example embodiments, this portion of the address may be positioned as a prefix, such as, for example, a prefix that may be used in accordance with addressing that complies with the IPv6 protocol. A prefix in this regard may be one example of a network indicator portion of an address. According to various example embodiments, the network indicator portion of the address which is indicative of the subnet or network may be positioned in various locations within an address, and as, such the portion may be a positioned as a suffix or elsewhere in the address. The following provides example embodiments that are described in the context of IPv4 and IPv6, but one of skill in the art would appreciate that the features described herein would be applicable in protocols other than IPv4 and IPv6.

FIG. 1a illustrates an example communications system 100 including a host 110, an IPv6 network 115, an IPv4 network 120, a network address translator (NAT) 125, a domain name server (DNS) server 130, and a server 150. The DNS server 130, which in some example embodiments may be a DNS64 server, may include a database of domain names and associated interne protocol (IP) addresses. In this regard, the DNS server 130 may be configured to receive a request that includes a name (for example, domain name or uniform resource locator (URL)) and return to the requestor an IP address that can be used for communications with the associated network node. The DNS server 130 may be configured to receive an address query for an IPv4 address record, which is referred to an as "A" query for "address" query, and return to the requestor an IPv4 address record that includes the IPv4 address for the respective network name. Further, the DNS server 130 may be configured to receive an address query for an IPv6 address record, which is referred to an "AAAA" record query, and return to the requestor an IPv6 address record that includes the IPv6 address for the respective network name. The four A's in the AAAA record query is a mnemonic to indicate that the IPv6 address is four times the bit length of the IPv4 address.

In some example embodiments, such as, for example, when the DNS server 130 is a DNS64 server, the DNS server 130 may receive an AAAA record query for a name that has not been assigned a native IPv6 address and synthesize an IPv6 address from the IPv4 address, and return the synthesized IPv6 address in an IPv6 address record to the requesting entity. According to various example embodiments, the synthesis of an IPv6 address can involve combining the IPv4 address with a prefix used on the IPv6 network 115 by the DNS server 130.

Figure 1B:
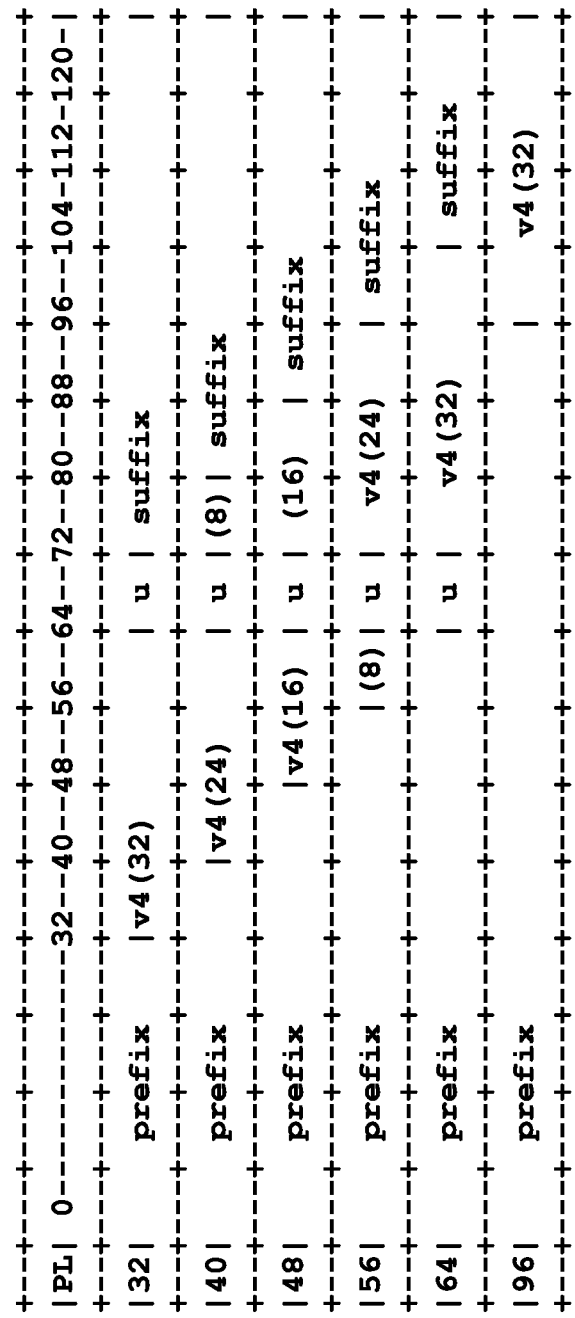
FIG. 1b illustrates a chart of formulations for synthesized IPv6 addresses having embedded IPv4 addresses according to some example embodiments.

FIG. 1b is an example chart that indicates how an IPv4 address and a prefix can be used to synthesize an IPv6 address. According to some example embodiments, the prefix may be indicative of a subnet or the network to which the IPv4 address is associated. Depending on various criteria, a prefix may be of a particular length. For example, a prefix may be 32, 40, 48, 56, 64, or 96 bits in length (as indicated in the first column of FIG. 1b). For each prefix length, the formulation of the synthesized address may be different. In addition to a prefix, the synthesized IPv6 address may include the IPv4 address (indicated by "v4 (x bits)" and (y bits)), a reserved octet (indicated by "u"), and a suffix. According to various example embodiments, the reserved octet and the suffix may be reserved or set to zero.

As mentioned above, depending on the length of the prefix, the formulation of the 128 bit IPv6 address may be different. Moving from top to bottom along the rows of FIG. 1b, when the prefix is 32 bits long, the IPv4 address is located in bit positions 32 to 63. When the prefix is 40 bits long, 24 bits of the IPv4 address are encoded in positions 40 to 63, with the remaining 8 bits in positions 72 to 79. When the prefix is 48 bits long, 16 bits of the IPv4 address are encoded in positions 48 to 63, with the remaining 8 bits in positions 72 to 87. When the prefix is 56 bits long, 8 bits of the IPv4 address are encoded in positions 56 to 63, with the remaining 24 bits in positions 72 to 95. When the prefix is 64 bits long, the IPv4 address is encoded in positions 72 to 103, and when the prefix is 96 bits long, the IPv4 address are encoded in positions 96 to 127.

The synthesis of an IPv6 address can be useful to a requesting entity that, for example, only has access through an IPv6 environment (for example, IPv6 Network 115). In this regard, referring to FIG. 1a, assume the host 110, which may be a server, network node or other network entity, does not have direct access to the IPv4 network (for example, connection 135 does not exist and the host 110 must rely upon only connection 140 to the IPv6 network 115), but wishes to communicate with the server 150 that may be part of the IPv4 network 120. The host 110 may send an AAAA record query to the DNS server 130 for an IPv6 address for the server 150. The DNS server 130 may synthesize an IPv6 address and provide the address to the host 110. The host 110 can then begin communicating with the server 150 using the IPv6 address. However, since the server 150 is part of IPv4 network 120, the communications may be intercepted and translated by the NAT 125, which may be a NAT64. In this regard, the NAT 125 may be configured to convert the IPv6 address to an IPv4 address so that the communications can be routed to the server 150 via the IPv4 network 120.

Accordingly, the synthesized IPv6 address can be useful to the host 110 when the host 110 has only IPv6 access. However, for example, if the host 110 also has IPv4 access (for example, the connection 135 exists), in some instances, direct communications with the IPv4 network 150 using a native IPv4 address for server 150 may be more efficient, and may reduce the load on the NAT 125. This situation may occur when the host 110 is multihomed, in which case an operator of the IPv6 network 115 may not be aware of the host 110's IPv4 access. Additionally, situations where a synthesized IPv6 address is unnecessarily used can arise when, for example, the host 110 is misconfigured. Further, in some instances, such as, for example, those involving peer-to-peer communications, applications may use IPv4 address literals, and as such, a DNS64 server may be unable to assist by providing synthesized addresses, and a host may be required to synthesize the address at the host, which may require knowledge of the network prefix. As such, according to various example embodiments, a network node may need to determine whether a synthesized address has been provided and may need to determine the value of the network prefix.

Accordingly, various example embodiments of the present invention support the ability to detect a synthesized address and determine the length and content of the prefix that is being used by a network. In some example embodiments, the prefix may be determined without explicit support from the network. Further, some example embodiments are directed to the operation of, for example, the DNS server to provide an indication that an address has been synthesized and an indication of the length of the synthesized address in the form of a synthesis flag indicator. Upon determining the prefix, according to various example embodiments, various advantages can be realized and functionalities performed. For example, upon determining the prefix, addresses having the determined synthesized prefixes can be prioritized lower than other IPv4 addresses, thereby avoiding the additional and unnecessary loading on the NAT when direct IPv4 access is available. Further, for example, local IPv6 address synthesis can be performed by the host. Local synthesis may be used when an IPv6 application is attempting to reach IPv4 literal addresses. In this regard, the addresses may be modified using the determined prefix (for example, an application having a need to contact a network node with address 1.2.3.4 may determine the corresponding IPv6 address prefix and modify the address as prefix+1.2.3.4). Furthermore, if a host is running, for example, Bump-in-the-API (as indicated in *Dual Stack Hosts Using "Bump-in-the-API"* (*BIA*), Request for Comments 3338, S. Lee et. al., October 2002 which may be found at http://www.ietforg/rfc/rfc3338.txt) or Bump-in-the-Stack (as indicated in *Dual Stack Hosts Using the "Bump-in-the-Stack"* (*BIS*), Request for Comments 2767, K. Tsuchiya et. al., February 2000 which may be found at http://www.ietf.org/rfc/rfc2767.txt), the host may utilize the prefix in address synthesis, rather than implementing some dynamic host configuration protocol (DHCP) options.

Figure 2:
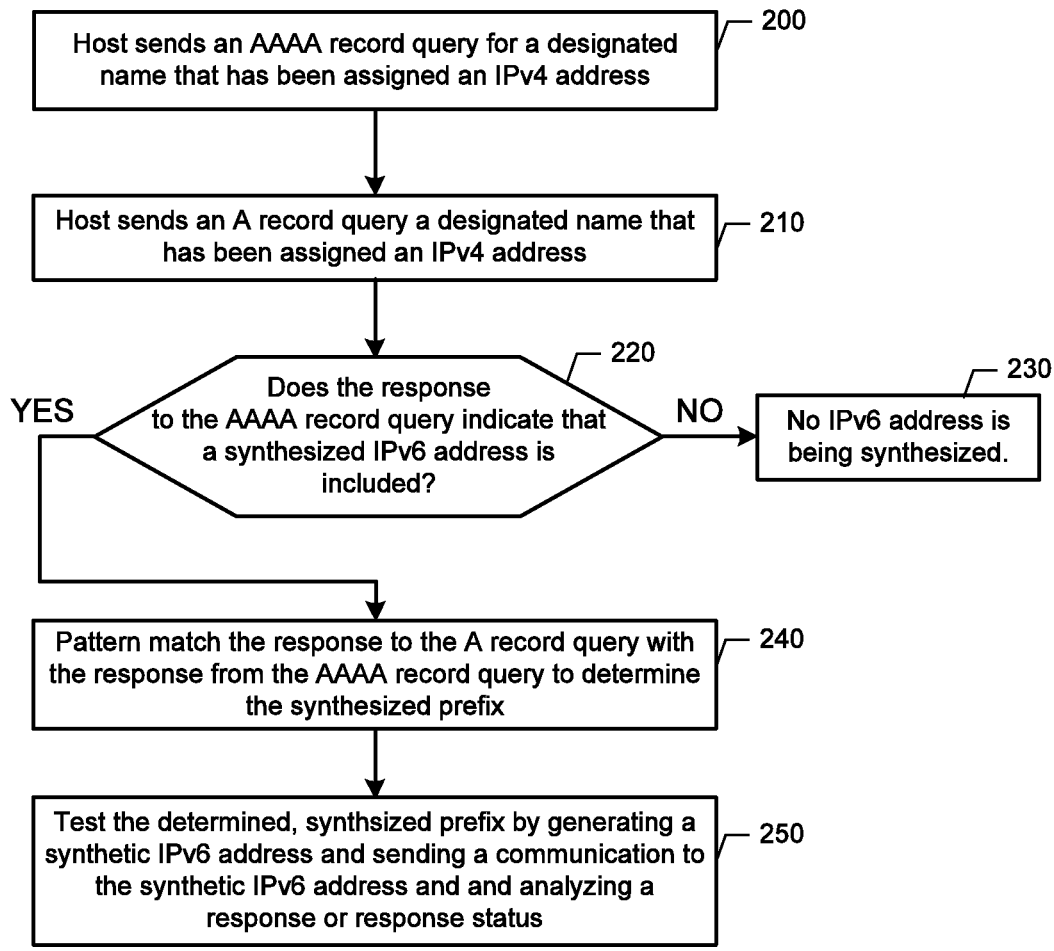
FIG. 2 illustrates a flowchart of an example method for detecting a synthesized address according to various example embodiments of the present invention.
Figure 3:
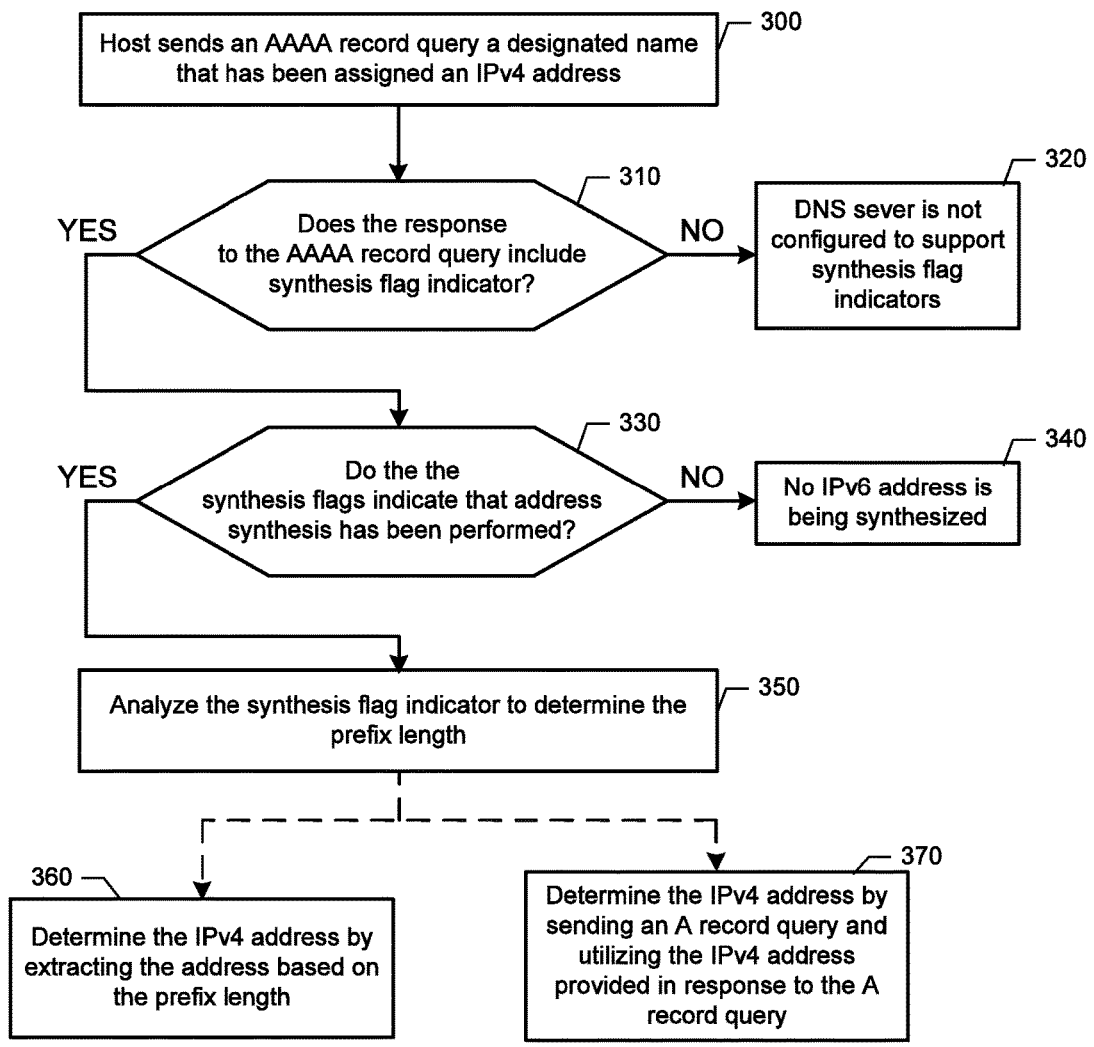
FIG. 3 illustrates a flowchart of another example method for detecting a synthesized address according to various example embodiments of the present invention.

FIGS. 2 and 3 illustrate flowcharts describing example techniques for detecting a synthesized address and determining a prefix of the synthesized address. The example techniques include the utilization of an AAAA record query for an address associated with a designated name, where the designated name has been assigned, or is otherwise known to have, an IPv4 address, and in some example embodiments, the designated name has been assigned or is otherwise known to have only an IPv4 address and no IPv6 native address. As such, according to various example embodiments, the response to the AAAA record query for the designated name may return a synthesized IPv6 address. The designated name may be determined in a number of ways according to various example embodiments. A first manner of determining the designated name may be to define a name specifically for the purpose of determining the prefix of a synthesized address. In this regard, a host may assign, for example, aaaatest.domain_name.com to have only an IPv4 address. Communications devices may be configured (for example, hard-coded in some cases, or the naming convention may be stored) with this name or a naming convention for use in determining the prefix. The associated local DNS server may be configured accordingly. A second manner of defining the designated name may involve having an Internet organization, such as, for example, the Internet Assigned Numbers Authority (LANA) host a global IPv4 only name, (for example, aaatest.iana.org) that would be known to be assigned only an IPv4 address. Little or no traffic would be sent to the designated name, unless, for example, the same name may be used as part of a connectivity test, and the designated name may be cached by name resolvers.

In view of the foregoing, FIG. 2 illustrates a flowchart of an example method for detecting a synthesized address and determining the prefix according to various example embodiments of the present invention. At 200, a host (for example, host 110) may send an AAAA record query to a DNS server. The AAAA record query may be a request for an IPv6 address associated with a designated name that has been assigned an IPv4 address, and, in some embodiments, the designated name may be known to have only been assigned an IPv4 address and has not been assigned an IPv6 address (for example, the requesting device is configured with this information). At 210, the host sends an A record query to a DNS server. The A record query may be a request for an IPv4 address associated with the designated name.

At 220, a response to the AAAA record query may be analyzed. If the response does not indicate an IPv6 address, then a determination may be made that the DNS server is not a DNS64 server and no IPv6 address has been synthesized at 230. If the response to the AAAA record query provides an IPV6 address, a determination may be made that the DNS server in the network is a DNS64 server and the IPv6 address has been synthesized. A determination may also be made that the network includes a NAT that may be a NAT64.

Accordingly, at 240, pattern matching may be performed. In this regard, the response to the A record query may be pattern matched with response to the AAAA record query to determine the synthesized prefix. More specifically, the IPv6 address may be pattern matched against the IPv4 address, for example based on the possible formulations described in FIG. 1b to determine the prefix.

At 250, the prefix may be tested by generating a synthesized IPv6 address at the host and sending a communication to the resultant address. In this regard, the host may establish a test connection to the address of the designated name or another well-known IPv4-only name by, for example, generating a synthesized IPv6 address. In some example embodiments, the host may send another A record query to, for example, ipv4only.domain_name.com, and combine the received IPv4 address with a determined IPv6 prefix to send a communication (for example, a packet). A received response to the communication may be analyzed to verify that a correct prefix has been determined. If no response is received, an error in determining the prefix may have occurred.

In an example scenario of implementing the example method of FIG. 2, a host may formulate and send an AAAA record query and an A record query for the name aaaat-est.widgetcompany.com. In the example scenario, the host may receive a response with an A record that includes 85.85.85.85 (equals hex 0x55, 0x55, 0x55, 0x55), and a response with an AAAA record that includes 2001:0db8:0000::5555:5555. The host can then pattern match the addresses and determine the network service provider's prefix is 2001:0db8:0000::/96, since the 0x55555555 pattern is found at the end of the IPv6 address. A verification procedure as described above may follow.

However, the network may use a prefix other than a /96 prefix. In this regard, for example, the AAAA record may include 2001:0db8:0000:0000:0055:5555:5500:0000. The host may consider the various address patterns to determine that the network service provider's prefix is 2001:0db8:0000::/64 because the 0x55555555 pattern is found at the certain place at the middle of IPv6 address as indicated by the various address formulations of FIG. 1b. In some example embodiments, the process may be repeated with other names within the network to ensure that the correct prefix has been determined. The host may also determine the suffix used by the network service provider, and may copy the particular suffix when generating any locally synthesized IPv6 addresses. Alternatively, the host may determine that the suffix is being used for another purpose, such as, for example, as a checksum, and the host may use the associated technique to generate the appropriate suffix when synthesizing a local IPv6 address.

FIG. 3 illustrates a flowchart of another example method for detecting a synthesized address and determining the prefix according to various example embodiments of the present invention. The example method FIG. 3 may involve a host (for example, host 110) and a DNS server (for example, DNS server 130) that may be configured to generate and analyze synthesis flag indicators in response to an AAAA record request. In this regard, the DNS server may be configured to provide a response to the AAAA record request that includes a synthesis flag indicator for analysis by the requesting host to determine whether the provided IPv6 address was synthesized and the bit length of the prefix. According to some example embodiments, the synthesis flag indictor may be a collection of bits that indicate whether the provided IPv6 address was synthesized and the bit length of the prefix. In some example embodiments, the collection of bits may be part of an extension mechanism for DNS (EDNS0) (as indicated in *Extension Mechanisms for DNS* (*EDNS0*), Request for Comments 2671, P. Vixie, August 1999 which may be found at http://tools.ietf.org/rfc/rfc2671.txt). The synthesis flag indicator may be formulated to indicate whether the prefix is of length /32, /40, /48, /56, /64 or /96. For example, a three-bit flag (SY-flags) may be used where 000 means no synthesis was undertaken, 001 means /32, 010 means /40, 011 means /48, 100 means /56, 101 means /64, 110 means /96, and 111 is reserved. The absence of the bits in, for example, the EDNS0 field may indicate that either no synthesis took place, or the DNS server does not support the EDNS0-based SY-flags solution.

Based on the forgoing, the example method of FIG. 3 can be described where synthesis flag indicators may be implemented. In this regard, at 300, a host (for example, host 110) may send an AAAA record query to a DNS server. The AAAA record query may be a request for an IPv6 address associated with a designated name that has been assigned an IPv4 address, and, in some embodiments, the designated name may be known to have only been assigned an IPv4 address and not been assigned an IPv6 address (for example, the requesting device may be configured with this information).

A response to the AAAA record query may be received and analyzed. At 310, a determination may be made as to whether the response to the AAAA record query includes a synthesis flag indicator. If no synthesis flag indicator is included in the response, then the DNS server may not be configured to support synthesis flag indicators at 320. As such, according to some example embodiments, when no synthesis flag indicator is included in the response, the host may be configured to perform the example method of FIG. 2 to determine whether a synthesized address has been provided and possibly determine the prefix. If the synthesis flag indicator is included, a determination may be made as to whether the synthesis flag indicator indicates that address synthesis has been performed. If the synthesis flag indicator indicates that the IPv6 address was not synthesized, then, at 340, a determination may be made that the IPv6 address is a native address and not a synthesized address. If the synthesis flag indicator indicates that the IPv6 address was synthesized, then, at 350, the synthesis flag indicator (for example, the SY-flags) may be analyzed to determine the length of the prefix. For example, if the host receives a response of 2001:0db8:0000::0102:0304 with SY-flags set in an EDNS0 extended flag field to 110, then the querying host can determine that the AAAA record and the IPv6 address was synthesized and the prefix is 2001:0db8:0000::/96.

Upon determining that the length of the prefix, the host may be configured to extract the prefix and the IPv4 address from the IPv6 address, at 360 based on the prefix length and, for example, the formulations of the addresses described with respect to FIG. 1*b*. Alternatively or additionally, the host may be configured, at 370, to determine the IPv4 address by sending an A record query to the DNS server for the designated name (since confirmation of the synthesized address indicates the DNS server has an A record), and then using the IPv4 address provided in response to the A record query.

Figure 4:
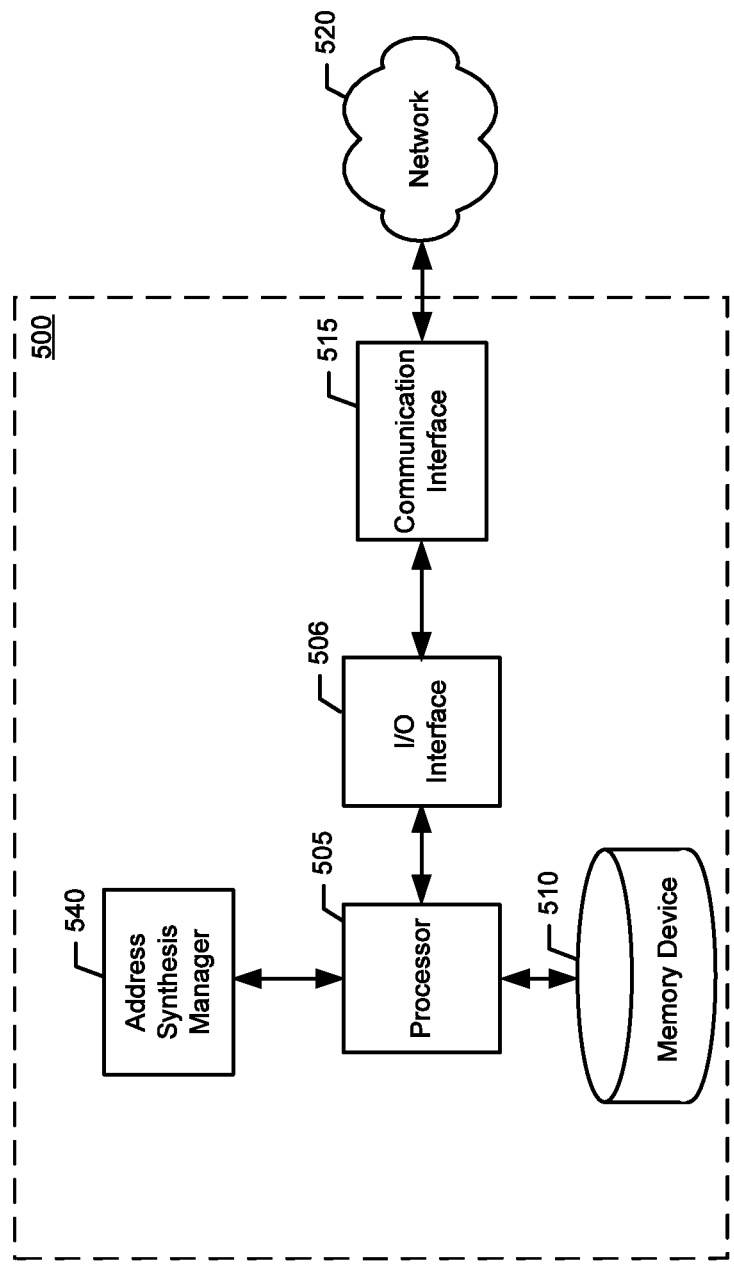
FIG. 4 illustrates a block diagram of an apparatus and associated system for address synthesis management according to some example embodiments of the present invention.

The description provided above and generally herein illustrates example methods, example apparatuses, and example computer program products for detecting and managing synthesized address prefixes. FIG. 4 depicts an example apparatus that is configured to perform various functionalities as described herein, such as, for example, those described with respect to operation and configuration of the host 110 and/or the DNS server 130, as described with respect to FIGS. 1*a*-3.

Referring now to FIG. 4, some example embodiments of the present invention are depicted as apparatus 500. Via different configurations of the address synthesis manager 540, the apparatus 500 may be configured to perform the functionality of a host (for example, host 110) or a domain name system server (for example, DNS server 130), or combinations thereof. Apparatus 500 may, be embodied as, or included as a component of, a communications device with wired or wireless communications capabilities. In some example embodiments, the apparatus 500 may be part of a communications device, such as a stationary or a mobile communications terminal. As a stationary communications terminal, the apparatus 500 may be part of, or embodied as, a server, a computer, an access point (for example, base station), communications switching device, or the like. As a mobile device, the apparatus 500 may be a mobile and/or wireless communications node such as, for example, a mobile and/or wireless server, computer, access point, communications switching device, handheld device (for example, telephone, portable digital assistant (PDA), mobile television, gaming device, camera, video recorder, audio/video player, radio, and/or a global positioning system (GPS) device), any combination of the aforementioned, or the like. Regardless of the type of communications device, apparatus 500 may also include computing capabilities.

The example apparatus 500 includes or is otherwise in communication with a processor 505, a memory device 510, an Input/Output (I/O) interface 506, a communications interface 515, and a address synthesis manager 540. The processor 505 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to some example embodiments, processor 505 may be representative of a plurality of processors, or one or more multiple core processors, operating in concert. Further, the processor 505 may be comprised of a plurality of transistors, logic gates, a clock (for example, oscillator), other circuitry, and the like to facilitate performance of the functionality described herein. The processor 505 may, but need not, include one or more accompanying digital signal processors. In some example embodiments, the processor 505 may be configured to execute instructions stored in the memory device 510 or instructions otherwise accessible to the processor 505. The processor 505 may be configured to operate such that the processor causes the apparatus 500 to perform various functionalities described herein.

Whether configured as hardware or via instructions stored on a computer-readable storage medium, or by a combination thereof, the processor 505 may be an entity capable of performing operations according to embodiments of the present invention while configured accordingly. Thus, in example embodiments where the processor 505 may be embodied as, or is part of, an ASIC, FPGA, or the like, the processor 505 may be specifically configured hardware for conducting the operations described herein. Alternatively, in example embodiments where the processor 505 is embodied as an executor of instructions stored on a computer-readable storage medium, the instructions specifically configure the processor 505 to perform the algorithms and operations described herein. In some example embodiments, the processor 505 may be a processor of a specific device (for example, a communications server) configured for employing example embodiments of the present invention by further configuration of the processor 505 via executed instructions for performing the algorithms, methods, and operations described herein.

The memory device 510 may be one or more computer-readable storage media that may include volatile and/or non-volatile memory. In some example embodiments, the memory device 510 includes Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (for example, hard disks, floppy disk drives, magnetic tape, etc.), optical disc drives and/or media, non-volatile random access memory (NVRAM), and/or the like. Memory device 510 may include a cache area for temporary storage of data. In this regard, some or all of memory device 510 may be included within the processor 505.

Further, the memory device 510 may be configured to store information, data, applications, computer-readable program code instructions, and/or the like for enabling the processor 505 and the example apparatus 500 to carry out various functions in accordance with example embodiments of the present invention described herein. For example, the memory device 510 could be configured to buffer input data for processing by the processor 505. Additionally, or alternatively, the memory device 510 may be configured to store instructions for execution by the processor 505.

The I/O interface 506 may be any device, circuitry, or means embodied in hardware, software, or a combination of hardware and software that is configured to interface the processor 505 with other circuitry or devices, such as the communications interface 515. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities of the present invention.

According to example embodiments, the communication interface 515 may be any device or means embodied in either hardware, a computer program product, or a combination of hardware and a computer program product that is configured to receive and/or transmit data from/to a network 520 and/or any other device or module in communication with the example apparatus 500. The communications interface may be configured to communicate information via any type of wired or wireless connection, and via any type of communications protocol, such as a communications protocol that support cellular communications. According to various example embodiments, the communication interface 515 may be configured to support the transmission and reception of communications in internet protocol based communications networks, such as, for example IPv4 networks, IPv6 networks, or combinations thereof. According to various example embodiments, the communication interface 515 may be configured to support the transmission and reception of communications in cellular networks, such as, for example, in a Long Term Evolution (LTE) environment using, for example, an evolved UMTS (Universal Mobile Telecommunications System) Terrestrial Radio Access Network (e-UTRAN) air interface. Processor 505 may also be configured to facilitate communications via the communications interface by, for example, controlling hardware included within the communications interface 515. In this regard, the communication interface 515 may include, for example, communications driver circuitry (for example, circuitry that supports wired communications via, for example, fiber optic connections), one or more antennas, a transmitter, a receiver, a transceiver and/or supporting hardware, including, for example, a processor for enabling communications. Via the communication interface 515, the example apparatus 500 may communicate with various other network entities in a device-to-device fashion and/or via indirect communications via a base station, access point, server, gateway, router, or the like.

The address synthesis manager 540 of example apparatus 500 may be any means or device embodied, partially or wholly, in hardware, a computer program product, or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the address synthesis manager 540 as described herein. In some example embodiments, the processor 505 includes, or controls, the address synthesis manager 540. The address synthesis manager 540 may be, partially or wholly, embodied as processors similar to, but separate from processor 505. In this regard, the address synthesis manager 540 may be in communication with the processor 505. In various example embodiments, the address synthesis manager 540 may, partially or wholly, reside on differing apparatuses such that some or all of the functionality of the address synthesis manager 540 may be performed by a first apparatus, and the remainder of the functionality of the address synthesis manager 540 may be performed by one or more other apparatuses.

The address synthesis manager 540 may be configured to perform the functionality described with respect to FIGS. 1a-3, or cause apparatus 500 to perform the functionality described with respect to FIGS. 1a-3, according to various example embodiments. In this regard, for example, based on the configuration of the address synthesis manager 540, the apparatus 500 may be configured to perform the functionality of the host 110 or the DNS server 130.

Further, the apparatus 500 and the processor 505 may be configured to perform the following functionality via address synthesis manager 540. In this regard, the address synthesis manager 540 may be configured to cause the processor 505 and/or the apparatus 500 to perform various functionalities, such as those depicted in the flowcharts of FIGS. 2, 3, 5, and 6 and as generally described herein.

Figure 5:
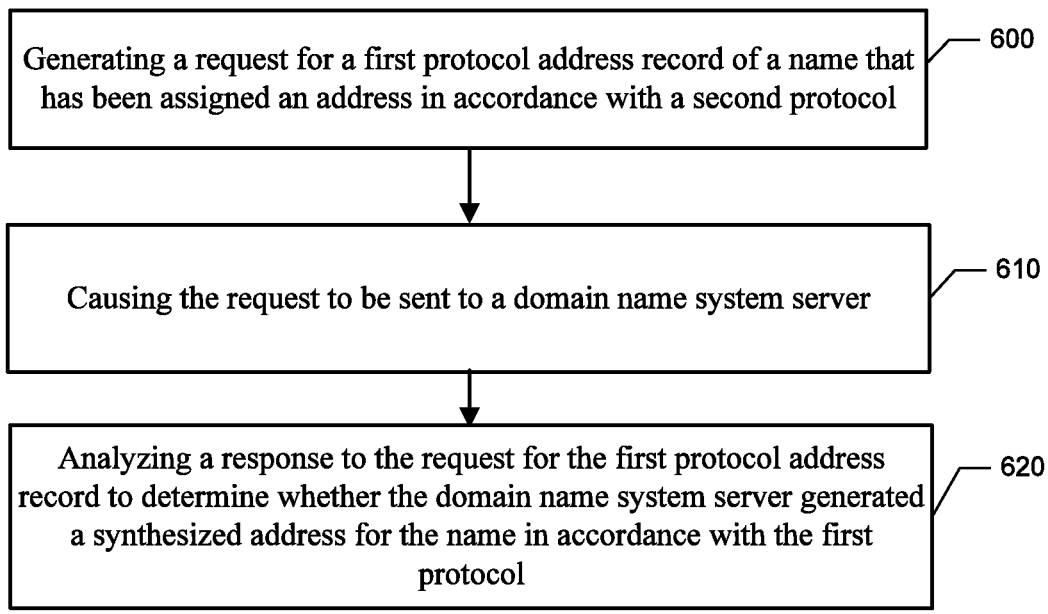
FIG. 5 illustrates a flowchart of some example methods for address synthesis detection and management according to some example embodiments of the present invention.

For example, with reference to FIG. 5, when the address synthesis manager 540 may be configured to cause the apparatus 500 to operate as a host, such as host 110, the address synthesis manager 540 may be configured to perform the following functionality. The address synthesis manager 540 may be configured to generate a request for a first protocol address record of a name that has been assigned an address in accordance with a second protocol at 600, and cause the request to be sent to a domain name system server at 610. Further, the address synthesis manager 540 may also be configured to analyze a response to the request for the first protocol address record to determine whether the domain name system server generated a synthesized address for the name in accordance with the first protocol at 620.

Further, in some example embodiments, the address synthesis manager 540 may also be configured to generate the request as an AAAA record query for the first protocol address record of the name that has been assigned the address in accordance with the second protocol. In some example embodiments, the first protocol address record may be an Internet Protocol version 6 address and the address in accordance with the second protocol may be an Internet Protocol version 4 address. Additionally, or alternately, according to some example embodiments, the address synthesis manager 540 may also be configured to analyze the response to the request for the first protocol address record to determine a first protocol network indicator portion of an address for the name (for example, prefix) included in the response to the request for the first protocol address record. Additionally, or alternately, according to some example embodiments, the address synthesis manager 540 may also be configured to generate a request for a second protocol address record of the name, cause the request for a second protocol address record to be sent to the domain name system server, and determine a first protocol network indicator portion of an address for the name included in the response to the request for the first protocol address record by pattern matching a first protocol address included in the response to the request for the first protocol address record with a second protocol address included in a response to the request for the second protocol address record. According to some example embodiments the address synthesis manager 540 may additionally, or alternately, be configured to analyze a synthesis flag indicator included in the response to the request for the first protocol address record to determine whether the domain name system server generated a synthesized address for the name in accordance with the first protocol. Additionally, or alternately, according to some example embodiments the address synthesis manager 540 may also be configured to analyze a synthesis flag indicator included in the response to the request for the first protocol address record to determine a length of a first protocol network indicator portion. According to some example embodiments the address synthesis manager 540 may be additionally, or alternately, configured to determine a second protocol address of the name by extracting the first protocol network indicator portion from a first protocol address included in the response to the request for a first protocol address record based on the length of the first protocol network indicator portion. Additionally, or alternatively, according to some example embodiments the address synthesis manager 540 may also be configured to generate a request for a second protocol address record of the name, cause the request for a second protocol address record to be sent to the domain name system server, and determine a second protocol address from a response to the request for the second protocol address record.

Figure 6:
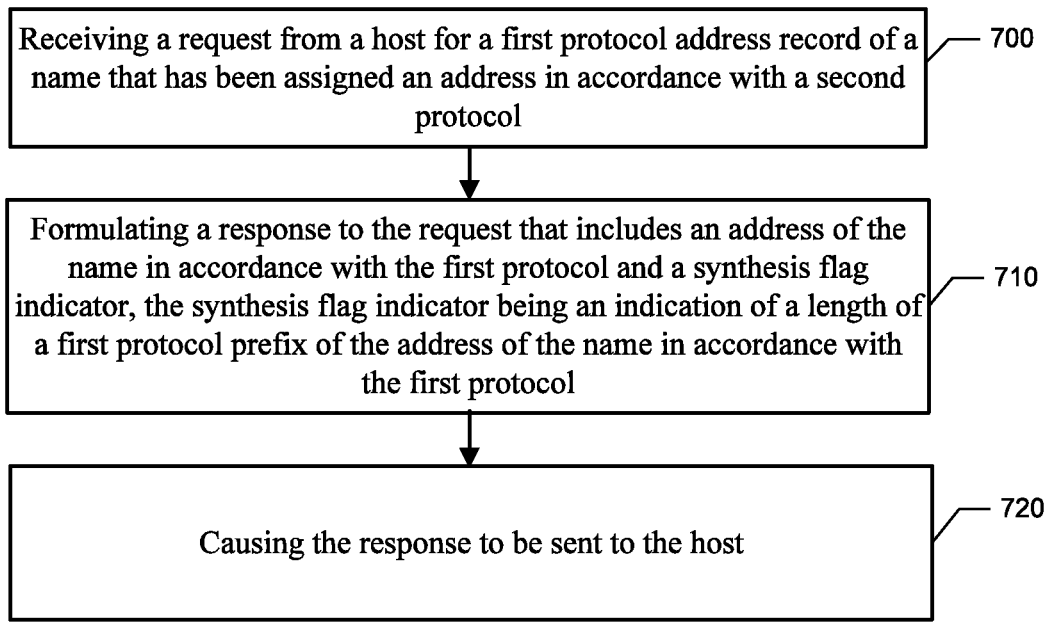
FIG. 6 illustrates a flowchart of other example methods for address synthesis detection and management according to some example embodiments of the present invention.

With reference to FIG. 6, when the address synthesis manager 540 is configured to cause the apparatus 500 to operate as a domain name system server, such as DNS server 130, the address synthesis manager 540 may be configured to perform the following functionality. In this regard, the address synthesis manager 540 may be configured to receive a request from a requestor (for example, a host) for a first protocol address record of a name that has been assigned an address in accordance with a second protocol at 700 and formulate a response to the request that includes an address of the name in accordance with the first protocol and a synthesis flag indicator at 710. The synthesis flag indicator may be an indication of a length of a first protocol network indicator portion of the address of the name in accordance with the first protocol. The address synthesis manager 540 may also be configured to cause the response to be sent to the requestor at 720.

In this regard, according to some example embodiments, the address synthesis manager 540 may also be configured to receive the request as an AAAA record query for the first protocol address record of the name that has been assigned the address in accordance with the second protocol. The first protocol address record may be an Internet Protocol version 6 address record with the address in accordance with the second protocol being an Internet Protocol version 4 address. Further, in some example embodiments, the address synthesis manager 540 may also be additionally or alternatively configured to formulate the response that includes the synthesis flag indicator, where the synthesis flag indicator may be a collection of bits that are part of an extension mechanism for domain name system (EDNS0) segment of the response. Additionally, or alternately, according to some example embodiments the address synthesis manager 540 may also be configured to formulate the response that includes the address in accordance with the first protocol and the synthesis flag indicator, where the synthesis flag indicator indicates that the address in accordance with the first protocol is not a synthesized address. According to some example embodiments the address synthesis manager 540 may be additionally, or alternately, configured to formulate the response that includes the address in accordance with the first protocol and the synthesis flag indicator, wherein the synthesis flag indicator indicates that the length of the first protocol network indicator portion of the address in accordance with the first protocol may be 32, 40, 48, 56, 64, or 96 bits in length. FIGS. 2, 3, 5, and 6 illustrate flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of FIGS. 2, 3, 5, and 6 may be stored on a memory device, such as memory device 510, of an example apparatus, such as example apparatus 500, and executed by a processor, such as the processor 505. As will be appreciated, any such program code instructions may be loaded onto a computer or other programmable apparatus (for example, processor 505, memory device 510, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction may be retrieved, loaded, and executed at a time. In some example embodiments, retrieval, loading and/or execution may be performed in parallel such that multiple instructions may be retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
generating a request for a first protocol address record of a name that has been assigned an address in accordance with a second protocol, wherein
the first protocol is an Internet Protocol version 6 and the second protocol is an Internet Protocol version 4; and
the name has only been designated in accordance with the second protocol and not been designated in accordance with the first protocol;
causing the request to be sent to a domain name system server; and
analyzing a response to the request for the first protocol address record to determine whether the response includes a synthesized address for the name in accordance with the first protocol, wherein analyzing the response to the request for the first protocol address record to determine whether the response includes a synthesized address comprises
determining a length and content of a prefix in accordance with the first protocol, analyzing content of the response to identify a second protocol address within one or more received first protocol address records, and pattern matching the second protocol address to the response to the request for the first protocol address record to determine a synthesized prefix by matching a predetermined pattern from a portion of the first protocol address other than a prefix of the first protocol address.

2. The method of claim 1, wherein generating the request for the first protocol address record of the name that has been assigned the address in accordance with the second protocol includes generating the request as a AAAA record query for the first protocol address record of the name that has been assigned the address in accordance with the second protocol, the first protocol address record including an Internet Protocol version 6 address and the address in accordance with the second protocol being an Internet Protocol version 4 address.

3. The method of claim 1, further comprising analyzing the response to the request for the first protocol address record to determine a first protocol network indicator portion of an address for the name included in the response to the request for the first protocol address record.

4. The method of claim 1, further comprising: generating a request for a second protocol address record of the name; causing the request for a second protocol address record to be sent to the domain name system server; and determining a first protocol network indicator portion of an address for the name included in the response to the request for the first protocol address record by pattern matching a first protocol address included in the response to the request for the first protocol address record with a second protocol address included in a response to the request for the second protocol address record.

5. The method of claim 1, wherein analyzing the response to the request for a first protocol address record to determine whether the domain name system server generated a synthesized address for the name in accordance with the first protocol includes analyzing a synthesis flag indicator included in the response to the request for the first protocol address record to determine whether the domain name system server generated a synthesized address in accordance with the first protocol.

6. The method of claim 1, further comprising analyzing a synthesis flag indicator included in the response to the request for the first protocol address record to determine a length of a first protocol network indicator portion.

7. The method of claim 6, further comprising determining a second protocol address for the name by extracting the first protocol network indicator portion from a first protocol address included in the response to the request for a first protocol address record based on the length of the first protocol network indicator portion.

8. An apparatus comprising at least one processor and at least one memory including computer program code, the at least one memory and the computer program code configured to, with the at least one processor, cause the apparatus at least to:
generate a request for a first protocol address record of a name that has been assigned an address in accordance with a second protocol, wherein
the first protocol is an Internet Protocol version 6 and the second protocol is an Internet Protocol version 4; and
the name has only been designated in accordance with the second protocol and not been designated in accordance with the first protocol;
cause the request to be sent to a domain name system server; and
analyze a response to the request for the first protocol address record to determine whether the response includes a synthesized address for the name in accordance with the first protocol, wherein being caused to analyze the response to the request for the first protocol address record to
determine whether the response includes a synthesized address comprises being caused to determine a length and content of a prefix in accordance with the first protocol,
analyze content of the response to identify a second protocol address within one or more received first protocol address records, and pattern matching the second protocol address to the response to the request for the first protocol address record to determine a synthesized prefix by matching a predetermined pattern from a portion of the first protocol address other than a prefix of the first protocol address.

9. The apparatus of claim 8, wherein the apparatus caused to generate the request for the first protocol address record of the name that has been assigned the address in accordance with the second protocol includes being caused to generate the request as a AAAA record query for the first protocol address record of the name that has been assigned the address in accordance with the second protocol, the first protocol address record including an Internet Protocol version 6 address and the address in accordance with the second protocol being an Internet Protocol version 4 address.

10. The apparatus of claim 8, wherein the apparatus is further caused to analyze the response to the request for the first protocol address record to determine a first protocol network indicator portion of an address for the name included in the response to the request for the first protocol address record.

11. The apparatus of claim 8, wherein the apparatus is further caused to: generate a request for a second protocol address record of the name; cause the request for a second protocol address record to be sent to the domain name system server; and determine a first protocol network indicator portion of an address for the name included in the response to the request for the first protocol address record by pattern matching a first protocol address included in the response to the request for the first protocol address record with a second protocol address included in a response to the request for the second protocol address record.

12. The apparatus of claim 8, wherein the apparatus caused to analyze the response to the request for a first protocol address record to determine whether the domain name system server generated a synthesized address in accordance with the first protocol for the name includes being caused to analyze a synthesis flag indicator included in the response to the request for the first protocol address record to determine whether the domain name system server generated a synthesized address for the name in accordance with the first protocol.

13. The apparatus of claim 8, wherein the apparatus is further caused to analyze a synthesis flag indicator included in the response to the request for the first protocol address record to determine a length of a first protocol network indicator portion.

14. The apparatus of claim 13, wherein the apparatus is further caused to determine a second protocol address of the name by extracting the first protocol network indicator portion from a first protocol address included in the response to the request for a first protocol address record based on the length of the first protocol network indicator portion.

15. A computer program product comprising a computer readable storage medium having computer code stored thereon, the computer code being configured to, when executed, cause an apparatus at least to perform:
generating a request for a first protocol address record of a name that has been assigned an address in accordance with a second protocol, wherein
the first protocol is an Internet Protocol version 6 and the second protocol is an Internet Protocol version 4; and
the name has only been designated in accordance with the second protocol and not been designated in accordance with the first protocol;
causing the request to be sent to a domain name system server; and
analyzing a response to the request for the first protocol address record to determine whether the response includes a synthesized address for the name in accordance with the first protocol, wherein analyzing the response to the request for the first protocol address record to
determine whether the response includes a synthesized address comprises determining a length and content of a prefix in accordance with the first protocol,
analyzing content of the response to identify a second protocol address within one or more received first protocol address records, and pattern matching the second protocol address to the response to the request for the first protocol address record to determine a synthesized prefix by matching a predetermined pattern from a portion of the first protocol address other than a prefix of the first protocol address.

16. The computer program product of claim 15, wherein the computer code configured to cause the apparatus to perform generating the request for the first protocol address record of the name that has been assigned the address in accordance with the second protocol includes being configured to perform causing the apparatus to generate the request as a AAAA record query for the first protocol address record of the name that has been assigned the address in accordance with the second protocol, the first protocol address record including an Internet Protocol version 6 address and the address in accordance with the second protocol being an Internet Protocol version 4 address.

17. The computer program product of claim 15, wherein the computer code is further configured to cause the apparatus to perform analyzing the response to the request for the first protocol address record to determine a first protocol network indicator portion of an address for the name included in the response to the request for the first protocol address record.

18. The computer program product of claim 15, wherein the computer code is further configured to cause the apparatus to perform: generating a request for a second protocol address record of the name; causing the request for a second protocol address record to be sent to the domain name system server; and determining a first protocol network indicator portion of an address for the name included in the response to the request for the first protocol address record by pattern matching a first protocol address included in the response to the request for the first protocol address record with a second protocol address included in a response to the request for the second protocol address record.

19. The computer program product of claim 15, wherein the computer code configured to cause the apparatus to perform analyzing the response to the request for a first protocol address record to determine whether the domain name system server generated a synthesized address in accordance with the first protocol for the name includes being configured to cause the apparatus to perform analyzing a synthesis flag indicator included in the response to the request for the first protocol address record to determine whether the domain name system server generated a synthesized address for the name in accordance with the first protocol.

20. The computer program product of claim 15, wherein the computer code is further configured to cause the apparatus to perform analyzing a synthesis flag indicator included in the response to the request for the first protocol address record to determine a length of a first protocol network indicator portion.

* * * * *